United States Patent
Desai et al.

(10) Patent No.: US 7,458,016 B1
(45) Date of Patent: Nov. 25, 2008

(54) FRAMEWORK FOR DECLARATIVE CUSTOMIZATION OF WEB PRESENTATION FORMATS

(75) Inventors: Sachin Desai, San Francisco, CA (US); Kiran Bellare, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 549 days.

(21) Appl. No.: 09/861,266

(22) Filed: May 18, 2001

(51) Int. Cl.
*G06N 3/00* (2006.01)
(52) U.S. Cl. .................................... 715/234
(58) Field of Classification Search ................ 715/523, 715/513, 500, 517, 530, 234, 243, 254, 255; 709/218; 345/864
See application file for complete search history.

(56) References Cited

U.S. PATENT DOCUMENTS

| | | | | |
|---|---|---|---|---|
| 5,983,170 | A * | 11/1999 | Goodman | 704/9 |
| 6,356,899 | B1 * | 3/2002 | Chakrabarti et al. | 707/5 |
| 6,457,030 | B1 * | 9/2002 | Adams et al. | 715/523 |
| 6,560,639 | B1 * | 5/2003 | Dan et al. | 709/218 |
| 6,668,354 | B1 * | 12/2003 | Chen et al. | 715/255 |
| 6,715,129 | B1 * | 3/2004 | Hind et al. | 715/513 |
| 2001/0054049 | A1 * | 12/2001 | Maeda et al. | 707/517 |

* cited by examiner

Primary Examiner—Stephen Hong
Assistant Examiner—Kyle R Stork

(57) ABSTRACT

A method for partitioning Web pages of a Web site into graphic elements and technical elements to enable efficient updating of the Web site. Graphic elements of a Web page are defined and a plurality of technical page element sets for respectively formatting the Web page in accordance with the technical page element sets are defined. The graphic elements of the Web page are converted into a stylesheet using a content-to-stylesheet generator. The Web page is then processed using the stylesheet in accordance with one of the technical page element sets to obtain a formatted Web page in accordance with the one technical page element set. The stylesheet can be compatible with a version of XSL (extensible stylesheet language). The formatted Web page is subsequently provided to a user via a server application. Efficient updating of the Web site is enabled by partitioning the graphic design elements, which define a look and feel for the Web page, from the technical page elements, which define the technical reliability of the software objects, scripts, macros, and the like. The partitioning allows the graphic design elements and the technical elements to be changed and updated more independently.

18 Claims, 5 Drawing Sheets

FRAMEWORK FOR DECLARATIVE CUSTOMIZATION OF WEB PRESENTATION FORMATS

FIELD OF THE INVENTION

The field of the present invention pertains to the management of Web pages on a distributed computer network. More particularly, the present invention relates to a method and system for efficiently implementing Web page updates and changes on an Internet site.

BACKGROUND OF THE INVENTION

One of the most important societal changes of recent times has been the emergence of the Internet, more particularly, the World Wide Web (e.g., the Web), as a predominant communications medium. The Web represents all the computer's on the Internet that offer users access to information and documentation media interactive hypermedia, or Web pages. Web pages describe documents in which hypertext links are used connecting a multitude of combinations of graphics, audio, video, and text. Such combinations are often interlinked and interconnected in nonlinear, nonsequential manners.

Web page authors use specialized software, for example, HTML (hypertext markup language), Java, XML (extensible markup language), and the like, to create Web pages and to format the various hypermedia links, objects, fields, etc., within the Web pages. The most basic component of Web page creation is the HTML editor. An HTML editor is a low-level Web site authoring tool that is essentially a text editor, specialized for writing HTML code. It assists the HTML author (e.g., the Web page author or Web site designer) by cataloging all HTML tags and common structures in menus and by being able to catch certain syntax errors. It often displays tags and contents in colors so they pop out for easy reference.

HTML editors comprise the foundation of many different prior art Web authoring software tools. A typical Web authoring tool comprises a Web site development system including a suite of programs that allow Web pages to be visually created like a desktop publishing program. Web authoring software (e.g., often synonymous with Web development software) generates the required HTML code for the pages and is able to switch back and forth (in varying degrees) between the page layout and the HTML. At a high level, the software's value to the designer is determined by the usefulness of its GUI tools for designing the page, and the software's ability to provide the desired Òlook and feelÓ of the page. At a low level, the clarity and reliability of HTML code that is generated, determines the technical correctness of the page, and how easily others can modify and maintain the site.

More advanced prior art Web authoring software provide the ability to read an entire Web site and display it as a graphical hierarchy of pages. Comprehensive programming-oriented sets of tools are provided for linking pages to databases and other software components, and for managing existing sites. The management and maintenance of large sites is typically a very technically involved responsibility. Such ÒWebmastersÓ must be technically proficient in HTML as well as one or more scripting and interface languages such as JavaScript and Perl, in addition to having technical experience with more than one type of Web server.

The graphical aspects, or the look and feel aspects, of Web site design is often a responsibility of more sales oriented personnel as opposed to technical personnel. For example, large commercial sites are often intimately related to or directly involved in product sales to customers. Commerce related internet sites, or Òelectronic commerceÓ sites, originally evolved from remote forms of electronic shopping to mean all aspects of business and market processes enabled by wide area communications networks. E-commerce is a rapidly growing field, and is generally understood to mean doing business on-line or selling and buying products and services through Web (e.g., Internet based) storefronts or through other similar distributed computer networks. Generally, understanding and tailoring the aspects of commerce is a particular expertise of the marketing/sales trained people.

Thus, modern Web page design (for commerce related sites) requires the coordination of the two types of skill sets, the technical (or programming) skill set and the market/sales (or graphic design) skill set. The graphical design skill set is required in order to devise an appropriate look and feel for the Web page which compliments and enhances the overall purpose of a particular Web site, for example, a retail Web site selling products/services to consumers. The technical skill set is required in order to ensure the reliability and functionality of the Web page, for example, to ensure the various data entry fields or selection buttons or the like function in the manner in which they were intended (e.g., bringing up the correct price when a user selects among the products/services).

There exists a problem however, with regard to arranging the close coordination required to update and maintain Web pages of a site. As described above, the look and feel aspects of a particular site are usually very closely intertwined with the technical aspects of the site (e.g., Java, tags, etc.). At present, no easily used (e.g., "WYSIWYG") editor for the pages. For example, in large e-commerce Web sites, the fashioning of new Web pages typically require graphic designers for defining the look and feel of the page, and software technicians/specialists for construction of the page itself. Coordinating the groups of people is an arduous, time-consuming task. Multiple iterations (e.g., reviews, comments, and new implementations) is usually required, with multiple "committee meetings" in order to get it right. Such inefficiency, with two sets of people trying to edit the same page, often leads to errors.

The resulting inefficiency makes the implementation of Web page changes very hard to carry out. Any changes in the look, color, tabs, buttons, or the like, often requires completely rebuilding the page. With current Web site authoring tools there exists very tight constraints with regard to the code of the page. It is difficult to simply "cut and paste" changes into the page. It becomes expensive to implement changes to, for example, respond to competitors. It becomes expensive to quickly modify pages in response to changes in the products. And often times, costly outside consultants are brought in to perform the required modifications.

Thus, what is required is a way to simplify the process of maintaining a Web site. What is required is a solution that renders the update and maintenance process of a Web site much easier than the prior art. What is required is a solution that accelerates the update process while reducing communication/coordination issues. The required solution should improve the speed and responsiveness of the resulting site to changing conditions, customers, and the like. Their required solution should streamline the Web site maintenance process while retaining reliable technical aspects (e.g., java, HTML, etc.) of the Web site. The present invention provides a novel solution to these requirements.

SUMMARY OF THE INVENTION

The present invention provides a way to simplify the process of maintaining a Web site. The present invention provides a solution that renders the update and maintenance process of a Web site much easier than the prior art, and provides a solution that accelerates the update process while reducing communication/coordination issues. In addition, the present invention improves the speed and responsiveness of the resulting site to changing conditions, customers, and the like, by streamlining the Web site maintenance process while retaining reliable technical aspects (e.g., java, HTML, etc.) of the Website.

In one embodiment, the present invention is implemented as a software based method for partitioning Web pages of a Web site into graphic elements and technical elements to enable efficient updating of the Web site. Graphic elements of a Web page are defined and a plurality of technical page element sets for respectively formatting the Web page are defined. The graphic elements of the Web page are converted into a stylesheet using a content-to-stylesheet generator. The Web page is then processed using the stylesheet in accordance with one of the technical page element sets to obtain a formatted Web page. The formatting and structure of the Web page is thus in accordance with the technical page element set. The stylesheet can be compatible with a version of XSL (extensible stylesheet language). The formatted Web page is subsequently provided to a user via a server application.

Thus, the efficient updating of the Web site is enabled by partitioning the graphic design elements, which define a look and feel for the Web page, from the technical page elements, which define the technical reliability of the software objects, scripts, macros, and the like. The partitioning allows the graphic design elements and the technical elements to be changed and updated more independently. The partitioning renders the update and maintenance process of a Web site much easier since it reduces communication/coordination issues between, for example, graphic design teams and software programming teams. The stylesheet ensures the technical aspects (e.g., java, HTML, etc.) of the Web site properly interface with the look and feel graphic design aspects to yield the desired formatted Web pages.

In a second embodiment, in addition to partitioning Web pages of a Web site into graphic elements and technical elements to enable efficient updating of the Web site, the method of the present invention provides for the selective generation of XML for the stylesheet based on the stylesheet tags included therein. Depending upon the particular Web page selected by a user (e.g., via a Web browser), only those object attributes corresponding to XSL tags from the corresponding stylesheet are selected in order to generate the resulting formatted Web page quickly at runtime.

In a third embodiment, in addition to the partitioning of the Web pages, an XSL stylesheet is generated, compiled into a binary tree, and cached. The cached version of the binary tree is used each time the corresponding stylesheet is used. Hence, the stylesheet is accessed once, compiled, and the results cached. Each subsequent time the stylesheet is accessed, the cached results are used to quickly generate the formatted Web page.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Figure 1:
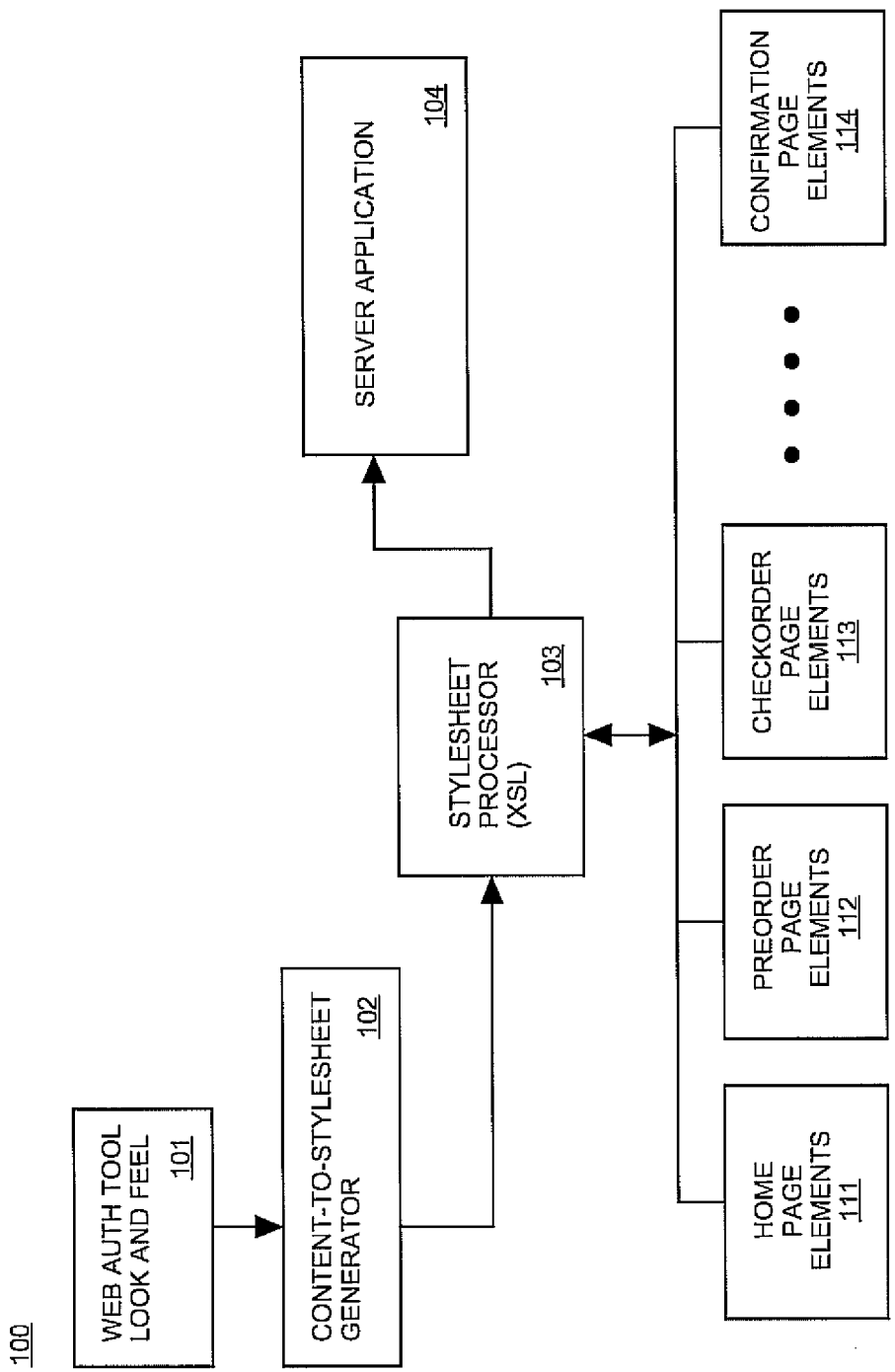
FIG. 1 shows a diagram of an electronic commerce Web site in accordance with one embodiment of the present invention.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention are directed towards a method and system for simplifying the process of maintaining a Web site. The present invention provides a solution that renders the update and maintenance process of a Web site much easier than the prior art, and provides a solution that accelerates the update process while reducing communication/coordination issues: In addition, the present invention improves the speed and responsiveness of the resulting site to changing conditions, customers, and the like, by streamlining the Web site maintenance process while retaining reliable technical aspects (e.g., java, HTML, etc.) of the Web site. The present invention and its benefits are further described below.

NOTATION AND NOMENCLATURE

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "communicating" or "instantiating" or "registering" or "displaying" or the like, refer to the action and processes of a computer system (e.g., computer system 512 of FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

Method and System of the Invention

FIG. 1 shows a diagram of a Web site implementation 100 in accordance with one embodiment of the present invention. Web site 100 shows an exemplary implementation of electronic commerce Web site. As depicted in FIG. 1, Web site implementation 100, hereafter Web site 100, shows a Web authoring tool 101 for defining graphic design "look and feel" elements of the Web pages of Web site 100, a content-to-stylesheet generator 102 for processing the graphic design elements produced by Web authoring tool 101 into a stylesheet used by a stylesheet processor 103, and application server 104 for serving up formatted Web pages to users via the Internet and their respective Web browsers.

Web site 100 of the present embodiment facilitates a software based method for partitioning Web pages of Web site 100 into graphic elements and technical elements to enable efficient updating. Within the hierarchical structure of Web site 100, graphic elements of the Web pages are defined independently. Similarly, a plurality of technical page element sets 111-114 for respectively formatting the Web page are defined. The partitioning allows the graphic design elements and the technical elements of the Web pages to be changed and updated more independently. In addition, the partitioning renders the update and maintenance process of a Web site much easier since it reduces communication/coordination issues between, for example, graphic design teams and software programming teams.

The Web authoring tool 101 is implemented using an easy to use, intuitive, "WYSIWYG" editor. The tool 101 is tailored for use in fashioning the graphic design based look and feel of the Web pages of Web site 100. Web authoring tool 100 allows Web pages to be visually created like a desktop publishing program, simplifying the generation of the required HTML code for the Web pages. The output of Web authoring tool 101 is typically HTML files, or XML files, defining the various look and feel aspects of the Web pages. Several types of "off-the-shelf" Web authoring tools can be used to implement Web authoring tool 101 (e.g., "FrontPage", "Dream weaver", etc.).

The output files of Web authoring tool 101 are processed using a content-to-stylesheet generator 102. The content-to-stylesheet generator 102 functions by analyzing the output files (e.g., Web pages) from Web authoring tool 101 and distilling the graphic design/look and feel aspects of the Web pages into a rule-based stylesheet. In this embodiment, stylesheet 103 is a XSL (extensible stylesheet language) based stylesheet. In general, XSL stylesheets are used in conjunction with XML data for formatting documents (e.g., web pages). However, in the present embodiment, the stylesheet processor 103 can also produce HTML format Web pages. The stylesheet produced by the content-to-stylesheet generator 102 is passed to the stylesheet processor 103.

Stylesheet processor 103 functions by processing received stylesheets from content-to-stylesheet generator 102 with one of plurality of technical page element sets 111-114. Generally, a stylesheet in accordance with the present invention comprises a master page layout used for controlling the formatting of the Web pages presented to users via server application 104. The stylesheet is a file that is used to store structure defining attributes of partially formatted Web pages, such as, for example, margins, tabs, fonts, headers, footers and other layout settings. In addition, the stylesheet contains "tags" which defined relationships of the various elements comprising the stylesheet to the partially formatted, desired Web page output. These elements include the graphical design/look and feel elements produced by Web authoring tool 101 and the technical elements of one of the technical page element sets 111-114. The stylesheet also defines a set of rules for generating a formatted Web page based upon an input. The input is defined in terms of the known rules of the stylesheet. In the present embodiment, the input comprises the graphic design/look and feel elements from Web authoring tool 101 and the technical elements from one of the technical page helmet sets 111-114. When a particular stylesheet is processed, its format settings, tags, rules, and the like, are applied to all the formatted Web pages created under it.

The technical page element sets 111-114 comprises the technical aspects (e.g., java, HTML, etc.) of different Web pages. The technical page elements includes the programming objects for ensuring reliability and functionality of the Web page, for example, to ensure the various data entry fields or selection buttons or the like function in the manner in which they were intended (e.g., bringing up the correct price when a user selects among the products/services). FIG. 1 depicts, for example, technical page element sets for a home page 111 of Web site 100, a pre-order page 112, a check order page 113, and so on, to a confirmation page 114.

Depending upon the specific formatted Web page selected by the user via server application 104, stylesheet processor 103 selects a corresponding one of the technical page element sets one 111 114 to obtain a formatted Web page in accordance with the one technical page element set. The formatted Web page is subsequently provided to a user via server application 104.

Thus, if new technical page elements are added in place of old technical page elements, so long as they are correctly tagged, stylesheet processor 103 will construct the correct arrangement of formatted Web page including the new elements.

Figure 2:
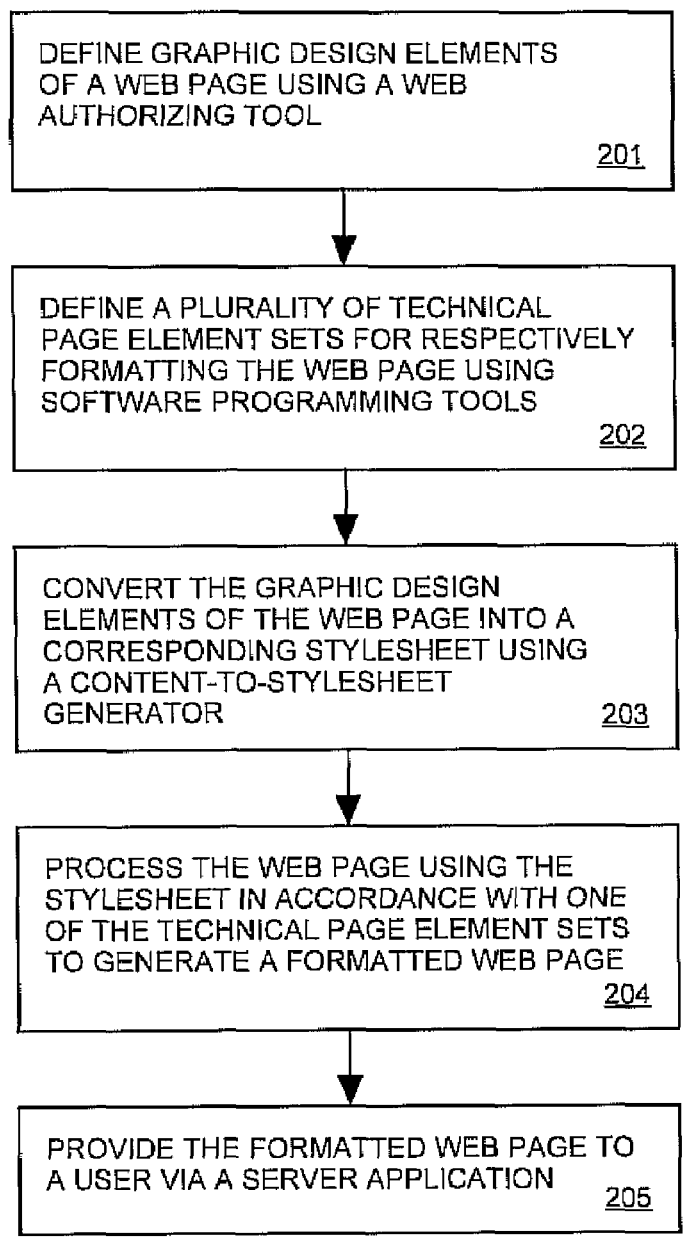
FIG. 2 shows a flow chart of the steps of a process in accordance with an alternative embodiment of the present invention.

Referring now to FIG. 2, a flowchart of the steps of a process 200 in accordance with one embodiment of the present invention is shown. As depicted in FIG. 2, process 200 diagrams the operating steps for implementing a software based method for partitioning Web pages of a Web site into graphic elements and technical elements as performed by, for example, Web site 100 of FIG. 1.

Process 200 begins in step 201, where graphic design elements of a Web page are defined using a Web authoring tool. As described above, the graphic design elements comprise the look and feel aspects of the Web page. In step 202, a plurality of technical page element sets for respectively formatting the Web page are defined. As described above, the technical page elements comprise the software code (e.g., Java, scripts, fields, etc.) required to ensure the reliable functioning of the Web page. The technical page elements are usually written using software programming tools.

Referring still to FIG. 2, in step 203, the graphic elements of the Web page are converted into a corresponding stylesheet using a content-to-stylesheet generator. As described above, the content-to-stylesheet generator functions by analyzing the graphic design/look and feel aspects of the Web page and distilling them into a rule-based stylesheet. In step 204, the Web page is then processed using the stylesheet in accordance with one of the technical page element sets to obtain a formatted Web page in accordance with the set. Subsequently, in step 205, the formatted Web page is provided to a user via a server application.

Figure 3:
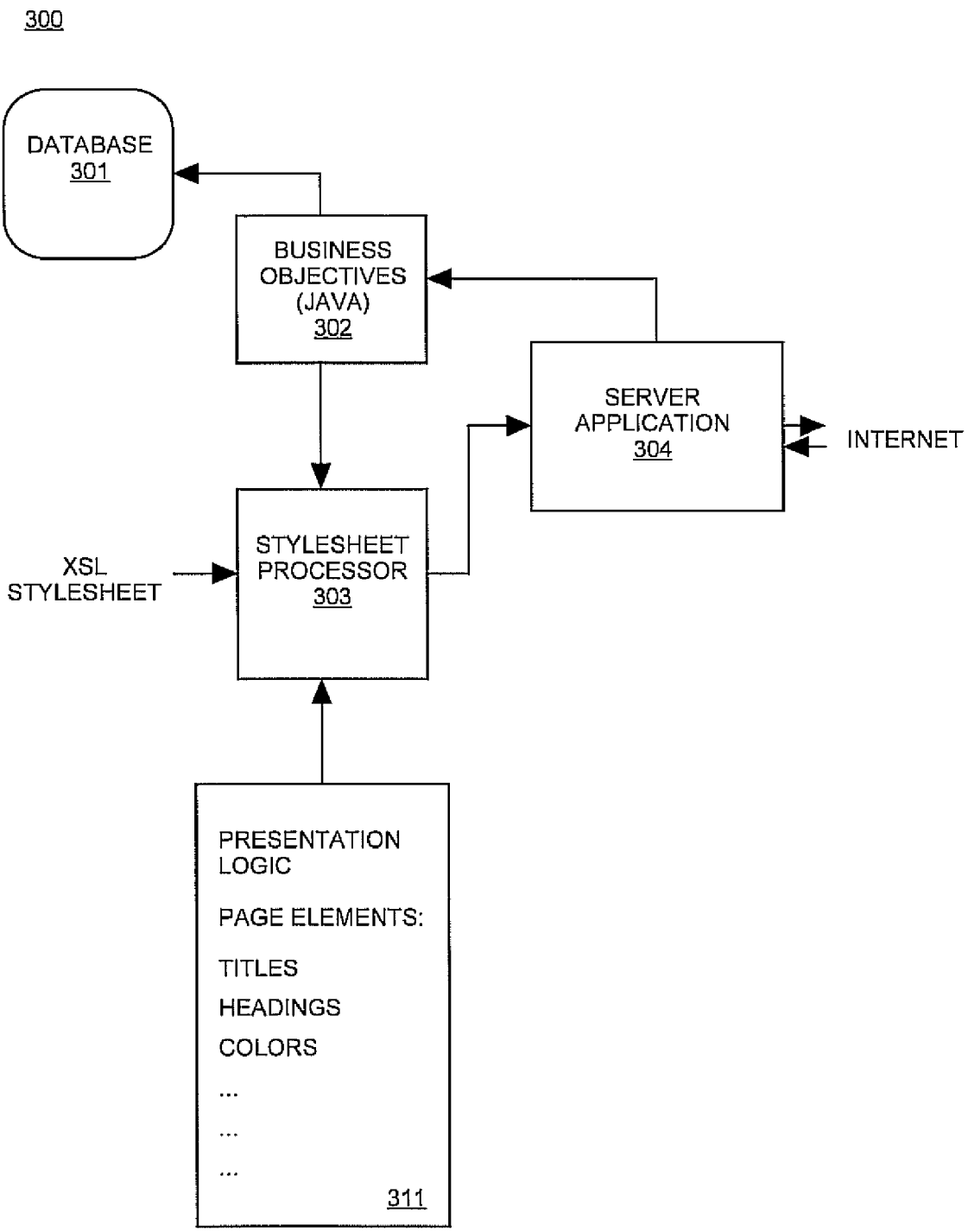
FIG. 3 shows a diagram of a Web site implementation in accordance with a second embodiment of the present invention.

Referring now to FIG. 3, a diagram of a Web site implementation 300 in accordance with a second embodiment of the present invention is shown. Web site implementation 300, hereafter Web site 300, shows an exemplary implementation of electronic commerce Web site similar to Web site 100 above, however, in addition to partitioning of web pages into graphic elements and technical elements, Web site 300 of the present embodiment provides for the selective generation of XML for the stylesheet based on the stylesheet tags included therein.

As depicted in FIG. 3, Web site 300 includes a database 301 coupled to a business objects processor 302. Object processor 302 receives page requests from server application 304 and provides business objects to stylesheet processor 303. Stylesheet processor 303 receives XSL stylesheets (e.g., from a content-to-stylesheet generator) and presentation logic/technical page elements 311 to produce formatted Web pages for server application 304.

In this Web site 300 embodiment, processing speed is gained by selectively generating object attributes corresponding to XSL tags from the stylesheet in order to get the resulting formatted Web page generated quickly at "runtime" speed. As with Web site 100, Web site 300 supports the partitioning of the look and feel aspects of Web page generation from the technical aspects of Web page generation. In addition to partitioning; Web site 300 delivers processing speed improvements by selectively generating object attributes corresponding to XSL tags from the stylesheet as determined by the desired Web page selected by the user.

Depending upon the particular Web page selected by a user through server application 304, object processor 302 selects only those object attributes corresponding to XSL tags from the corresponding stylesheet in order to generate the resulting formatted Web page quickly at runtime speed. Business objects corresponding to all of the stylesheet tags for all of the pages of Web site 300 are retrieved from the database 301 by object processor 302. However, in response to information received from application server 304, business objects processor 302 only transmits those business objects corresponding to the tags specific to the requested formatted Web page. Stylesheet processor 303 subsequently processes these business objects from object processor 302 with the specified presentation logic/page elements 311 to deliver the formatted Web page to application server 304.

Figure 4:
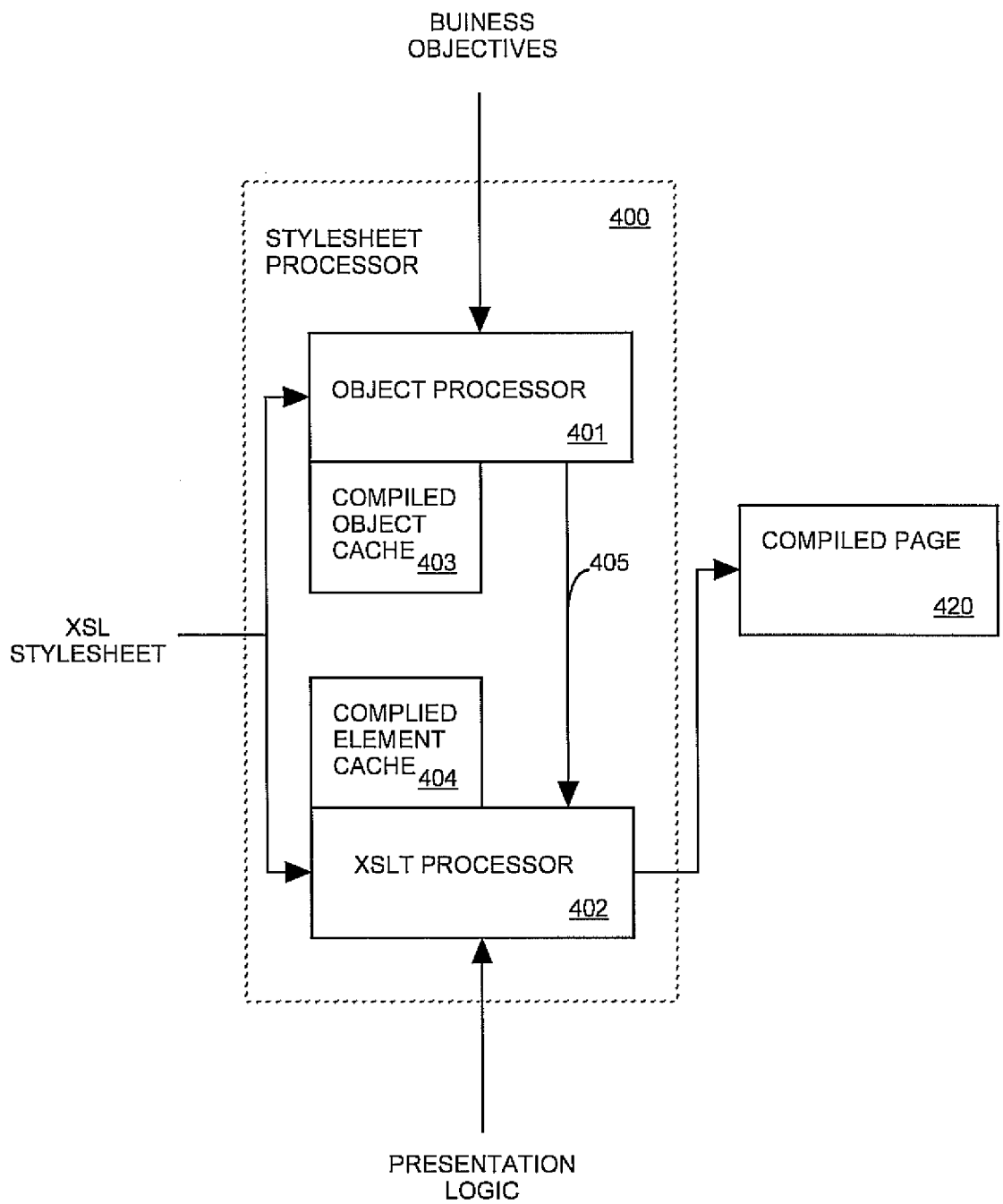
FIG. 4 shows a stylesheet processor in accordance with a third embodiment of the present invention.

Referring now to FIG. 4, a stylesheet processor 400 in accordance with a third embodiment of the present invention is shown. Stylesheet processor 400 is implemented within a hierarchical Web site similar to Web site 100 of FIG. 1. FIG. 4 shows an object processor 401 and an XSLT processor 402 coupled to respective caches, a compiled object cache 403 and a compiled element cache 404. Object processor 401 communicates with XSLT processor 402 via line 405. Both object processor 401 and XSLT processor 402 are coupled to receive incoming XSL stylesheets.

With stylesheet processor 400, in addition to the partitioning of the Web pages, additional performance enhancing features are provided. An XSL stylesheet is generated in the manner described above and provided to both the object processor 401 and the XSLT processor 402. In accordance with the particular stylesheet, XSLT processor 402 compiles the appropriate presentation logic into a binary tree used for generating the completed page 420 (e.g., the formatted Web page). This binary tree is stored within compiled element cache 404. The cached version of the binary tree is used each time the corresponding stylesheet is used. Hence, the stylesheet is accessed once, compiled, and the results cached. Each subsequent time the stylesheet is accessed, the cached results are used to quickly generate the formatted Web page.

Similarly, in accordance with the particular stylesheet, object processor 401 compiles the appropriate business objects (e.g., Java, etc.) into more efficiently run executables, which are then cached within compiled object cache 403. Each subsequent time the stylesheet is accessed for the particular Web page, the cached executables are transmitted by object processor 401 to XSLT processor 402 to enable the rapid generation of the completed Web page 420.

In this manner, compiled object cache 403 and compiled element cache 404 streamline the process of generating completed Web page 420. The caching of the binary trees and the business object executables allow the completed Web pages (e.g., completed page 420) to be generated very quickly at runtime, enhancing the responsiveness of the Web site to the various users.

Computer System Platform

Figure 5:
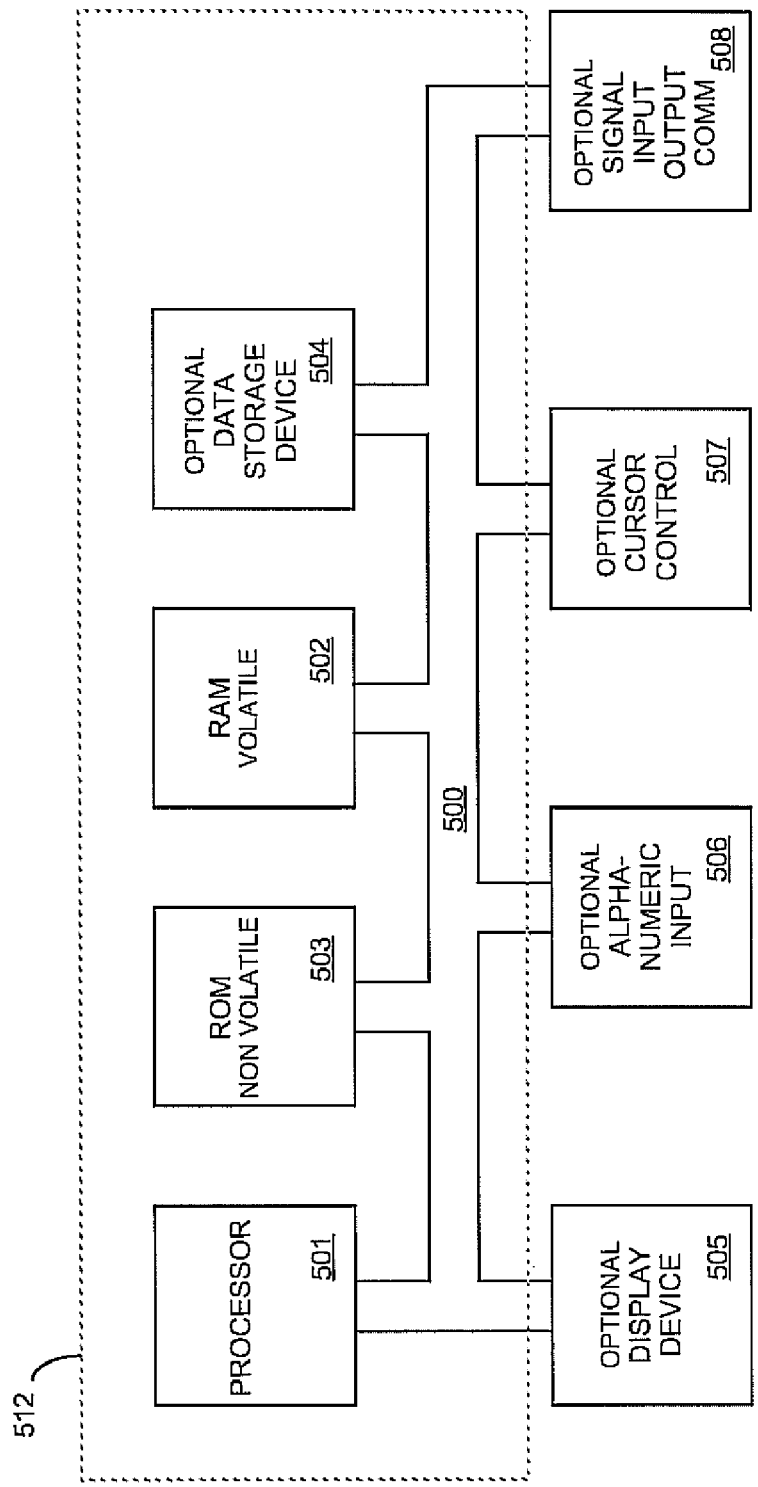
FIG. 5 shows the components of a computer system platform in accordance with one embodiment of the present invention.

With reference now to FIG. 5, a computer system 512 in accordance with one embodiment of the present invention is shown. Computer system 512 shows the components of a computer system in accordance with one embodiment of the present invention that provides the execution platform for implementing certain software based functionality of the present invention. As described above, certain processes and steps of the present invention are realized, in one embodiment, as a series of instructions (e.g., software program) that reside within computer readable memory units of a computer system (e.g., system 512) and are executed by the processor(s) of system 512. When executed, the instructions cause the computer system 512 to implement the functionality of the present invention as described above.

In general, computer system 512 shows the basic components of a computer system used to implement ÒserverÓ machines and "client" machines. Computer system 512 comprises an address/data bus 500 for communicating information, one or more central processors 501 coupled with the bus 500 for processing information and instructions, a computer readable volatile memory unit 502 (e.g., random access memory, static RAM, dynamic, RAM, etc.) coupled with the bus 500 for storing information and instructions for the central processor(s) 501, a computer readable non-volatile memory unit (e.g., read only memory, programmable ROM, flash memory, EPROM, EEPROM, etc.) coupled with the bus 500 for storing static information and instructions for the processor(s) 501. System 512 also includes a mass storage computer readable data storage device 504 such as a magnetic or optical disk and disk drive coupled with the bus 500 for storing information and instructions. Optionally, system 512 can include a display device 505 coupled to the bus 500 for displaying information to the computer user, an alphanumeric input device 506 including alphanumeric and function keys coupled to the bus 500 for communicating information and command selections to the central processor(s) 501, a cursor control device 507 coupled to the bus for communicating user input information, and command selections to the central processor(s) 501, and a signal generating device 508 coupled to the bus 500 for communicating command selections to the processor(s) 501.

Thus, the present invention provides a way to simplify the process of maintaining site. The present invention provides a solution that renders the update and maintenance process of a Web site much easier than the prior art, and provides a solution that accelerates the update process while reducing communication/coordination issues. In addition, the present invention improves the speed and responsiveness of the resulting site to changing conditions, customers, and the like, by streamlining the Web site maintenance process while retaining reliable technical aspects (e.g., java, HTML, etc.) of the Web site.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of partitioning Web pages of a Web site into graphic elements and technical elements to enable efficient updating of the Web site, the method comprising:
    defining graphic elements of a Web page;
    defining a plurality of technical page element sets comprising programming code for generating the Web page;
    automatically converting the graphic elements of the Web page into a stylesheet using a content-to-stylesheet generator;
    generating a binary tree based upon the stylesheet;
    caching the binary tree;
    processing the Web page using the stylesheet in accordance with one of the technical page element sets to obtain a formatted Web page in accordance with the one technical page element set, wherein said processing said Web page further comprises processing said Web page using said binary tree; and
    providing the formatted Web page via a server application.

2. The method of claim 1 further comprising:
    defining a look and feel for the Web page by defining the graphic elements.

3. The method of claim 2 further comprising:
    changing the look and feel of the Web page by changing the graphic elements.

4. The method of claim 1 further comprising:
    defining software objects for the Web page using the technical page element sets.

5. The method of claim 4 wherein the software objects for the Web page comprise Java based software objects.

6. The method of claim 1 wherein the stylesheet is compatible with a version of XSL.

7. A computer implemented method of partitioning Web pages of a Web site into graphic elements and technical elements to enable efficient updating of the Web site, the method implemented on a computer system including a processor coupled to a memory, the memory comprising computer readable instructions which when executed cause the computer system to implement a method comprising:
    accessing graphic elements of a Web page;
    accessing a plurality of technical page element sets comprising programming code for generating the Web page;
    automatically converting the graphic elements of the Web page into a stylesheet using a content-to-stylesheet generator;
    generating a binary tree based upon the stylesheet;
    caching the binary tree;
    processing the Web page using the stylesheet in accordance with one of the technical page element sets to obtain a formatted Web page in accordance with the one technical page element set, wherein said processing said Web page further comprises processing said Web page using said binary tree; and
    providing the formatted Web page via a server application.

8. The method of claim 7 further comprising:
    defining a look and feel for the Web page by defining the graphic elements.

9. The method of claim 8 further comprising:
    changing the look and feel for the Web page by changing the graphic elements.

10. The method of claim 7 further comprising:
    defining software objects for the Web page using the technical page element sets.

11. The method of claim 10 wherein the software objects for the Web page comprise Java based software objects.

12. The method of claim 7 wherein the stylesheet is compatible with a version of XSL.

13. The method of claim 7 further comprising:
    selectively processing object attributes corresponding to a plurality of tags from the stylesheet to generate the formatted Web page.

14. The method of claim 1, wherein said cached information is selected from a group consisting of at least one compiled object corresponding to said stylesheet and at least one compiled element corresponding to said stylesheet.

15. A computer implemented web site updating method, the method implemented on a computer system comprising a processor coupled to a memory, the memory comprising computer readable instructions which when executed cause the computer system to implement a method comprising:
    accessing graphic elements of a Web page;
    accessing a plurality of technical page element sets comprising a plurality of software objects for respectively formatting the Web page;
    editing the graphic elements in a manner independent of the technical page element sets;
    editing the technical page element sets in a manner independent of the graphic elements;
    automatically converting the graphic elements of the Web page into a stylesheet using a content-to-stylesheet generator;
    generating a binary tree based upon the stylesheet;
    caching the binary tree;
    processing the Web page using the stylesheet in accordance with one of the technical page element sets to obtain a formatted Web page in accordance with the one technical page element set, wherein said processing said Web page further comprises processing said Web page using said binary tree; and
    providing the formatted Web page via a server application.

16. The method of claim 15 wherein the software objects for the Web page comprise Java based software objects.

17. The method of claim 15 wherein the stylesheet is compatible with a version of XSL.

18. The method of claim 15 further comprising:
    selectively generating object attributes corresponding to a plurality of tags from the stylesheet to generate the formatted Web page more quickly.

* * * * *

UNITED STATES PATENT AND TRADEMARK OFFICE
CERTIFICATE OF CORRECTION

PATENT NO. : 7,458,016 B1  Page 1 of 1
APPLICATION NO. : 09/861266
DATED : November 25, 2008
INVENTOR(S) : Desai et al.

It is certified that error appears in the above-identified patent and that said Letters Patent is hereby corrected as shown below:

On sheet 4 of 5, in Figure 4, Ref. Numeral 404, line 1, delete "COMPLIED" and insert -- COMPILED --, therefor.

Signed and Sealed this

Seventeenth Day of August, 2010

David J. Kappos
*Director of the United States Patent and Trademark Office*